(12) United States Patent
Alexander

(10) Patent No.: US 8,275,837 B1
(45) Date of Patent: Sep. 25, 2012

(54) SYSTEM AND METHOD FOR SCHEDULING CALENDAR EVENTS

(75) Inventor: James Alexander, Mount Kisco, NY (US)

(73) Assignee: Vizibility Inc., New York, NY (US)

(*) Notice: Subject to any disclaimer, the term of this patent is extended or adjusted under 35 U.S.C. 154(b) by 0 days.

(21) Appl. No.: 13/494,915

(22) Filed: Jun. 12, 2012

Related U.S. Application Data (63) Continuation of application No. 13/436,755, filed on Mar. 30, 2012.

(60) Provisional application No. 61/533,549, filed on Sep. 12, 2011, provisional application No. 61/654,722, filed on Jun. 1, 2012.

(51) Int. Cl.
*G06F 15/16* (2006.01)
*G06F 12/00* (2006.01)

(52) U.S. Cl. .................................................. 709/204

(58) Field of Classification Search .......... 709/203–208, 709/217–218, 250
See application file for complete search history.

(56) References Cited

U.S. PATENT DOCUMENTS

| | | | |
|---|---|---|---|
| 2008/0040188 A1 | 2/2008 | Klausmeier | |
| 2009/0089399 A1* | 4/2009 | Beck et al. | 709/218 |
| 2010/0180212 A1* | 7/2010 | Gingras et al. | 715/751 |
| 2011/0054976 A1* | 3/2011 | Adler et al. | 705/9 |
| 2011/0071878 A1* | 3/2011 | Gingras et al. | 705/8 |
| 2011/0276372 A1* | 11/2011 | Spivack et al. | 705/14.5 |
| 2011/0314115 A1* | 12/2011 | Nagaraj | 709/206 |
| 2012/0029964 A1* | 2/2012 | Tengler et al. | 705/7.19 |

* cited by examiner

*Primary Examiner* — Zarni Maung
(74) *Attorney, Agent, or Firm* — Novak Druce + Quigg LLP (57) ABSTRACT

Disclosed are systems, methods, and non-transitory computer-readable storage media for scheduling calendar events. An exemplary method includes receiving, from a requesting device, an invite request referencing a network address associated with a calendar for a target user, wherein the network address is encoded in a machine-readable code from which the requesting device extracted the network address. The method then includes, sending a preauthorized availability for the calendar of the target/service user to the requesting device, wherein the availability is for a predetermined time length. The method then includes receiving a selection of a desired meeting time within the preauthorized availability from the requesting device and creating a calendar event according to the received selected desired meeting time.

18 Claims, 12 Drawing Sheets

Vizibility®beta     Hi Gregory   Manage Account | Manage Users | Administration | Sign Out Companies   Individuals   Partners   Help

| Manage My Account ○ | Set Up My QR Code ○ | Curate My Google Results ○ | Set Up My Notifications ○ | Share My Online Identity ○ | Who Searched For Me? ○ | Search Results Change Report ○ | Store ○ |

Mobile Setup: Complete

Vizibility®

○ Complete
⊘ Incomplete

[Edit]

Set Up Your Mobile Business Card Details
Expand All | Collapse All

▷ Mobile Branding    [ON]

▽ Office Hours    [ON]

Block off time in your calender, and allow people who search for you to schedule meetings seamlessly.

Create Time Slot      Available Times

Day:    Monday ▷    Wednesday 2.30 PM - 3.30 PM ⊟
Start time:   9.00 AM ▷    Thursday 2.30 PM - 3.30 PM ⊟
End time:   11.00 AM ▷
Duration:   30 Minutes ▷
Repeat   Weekly ▷
[Create]

Add Notes For Scheduler:

Please set the agenda for our call here....

Synch your personal calenders to Office Hours.

☒ GMail    ☐ Outlook    ☐ iCloud

---

Mobile phone preview:

Vizibility®

Gregory Harris
Product Manager
📞   🔍

Notes & vCard

You met Gregory Harris on Monday,...
April 02, 2012 [Edit Notes]

[Your email address]

[Send vCard & Notes]

Our CommonConnections™
in f [Mutual Contacts]

SYSTEM AND METHOD FOR SCHEDULING CALENDAR EVENTS

RELATED APPLICATIONS

This application claims priority to United States Non-Provisional patent application Ser. No. 13/436,755, filed 30 Mar. 2012, U.S. Provisional Patent Application No. 61/533,549, filed 12 Sep. 2011 and U.S. Provisional Patent Application No. 61/654,722, filed 1 Jun. 2012, the contents of which are herein incorporated by reference in their entirety.

BACKGROUND

1. Technical Field

The present disclosure relates to enabling access to preauthorized calendar data to schedule calendar events.

2. Introduction

Often individuals meet at networking events and share business cards, resumes, or other contact information. Later, after the networking event, the individuals may wish to set up a meeting. Users can attempt to schedule a meeting on the spot, but one or the other may not have a computing device, their battery may be dead, and even if they can schedule a meeting, social protocol may prohibit or look down on lengthy interactions with a mobile phone or tablet during such networking events. Accordingly, what is needed in the art is a way to enhance the scheduling of meetings.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for scheduling calendar events. An exemplary computer-implemented method includes receiving, from a requesting device associated with a requestor, an invite request referencing a network address associated with a calendar for a target user, wherein the network address is encoded in a machine-readable code from which the requesting device extracted the network address. In one example, the machine-readable code is a QR code, a Microsoft TAG, a matrix bar code, a wireless near-field communication signal, a RFID signal, a Bluetooth signal, a short-range wireless signal, a uniquely identifiable image, or a uniquely identifiable biometric code. The method then includes, sending a preauthorized availability for the calendar of the target user to the requesting device, wherein the availability is for a predetermined time length. The method then includes receiving a selection of a desired meeting time within the preauthorized availability from the requesting device. The method further includes creating a calendar event according to the received selected desired meeting time.

In one embodiment, the method includes automatically placing the calendar event on the target user calendar via an API and updating the preauthorized availability to exclude the placed calendar event. In another embodiment, the example includes sending the calendar event to the target user calendar, detecting acceptance of the calendar event, and updating the preauthorized availability to exclude the placed calendar event. In another embodiment the presenting the preauthorized availability for the target user further includes only presenting mutual availabilities for the target user and requestor. Another embodiment includes pre-populating the calendar event with at least one of date, time, duration, one or more invitees, phone number, web share URL, location, notes, and a link to a user profile.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for enhancing calendar scheduling. A brief introductory description of a basic general purpose system or computing device in FIG. 1 which can be employed to practice the concepts is disclosed herein. A more detailed description of the exemplary approaches and sample infrastructure will then follow. These variations shall be discussed herein as the various embodiments are set forth. The disclosure now turns to FIG. 1.

Figure 1:
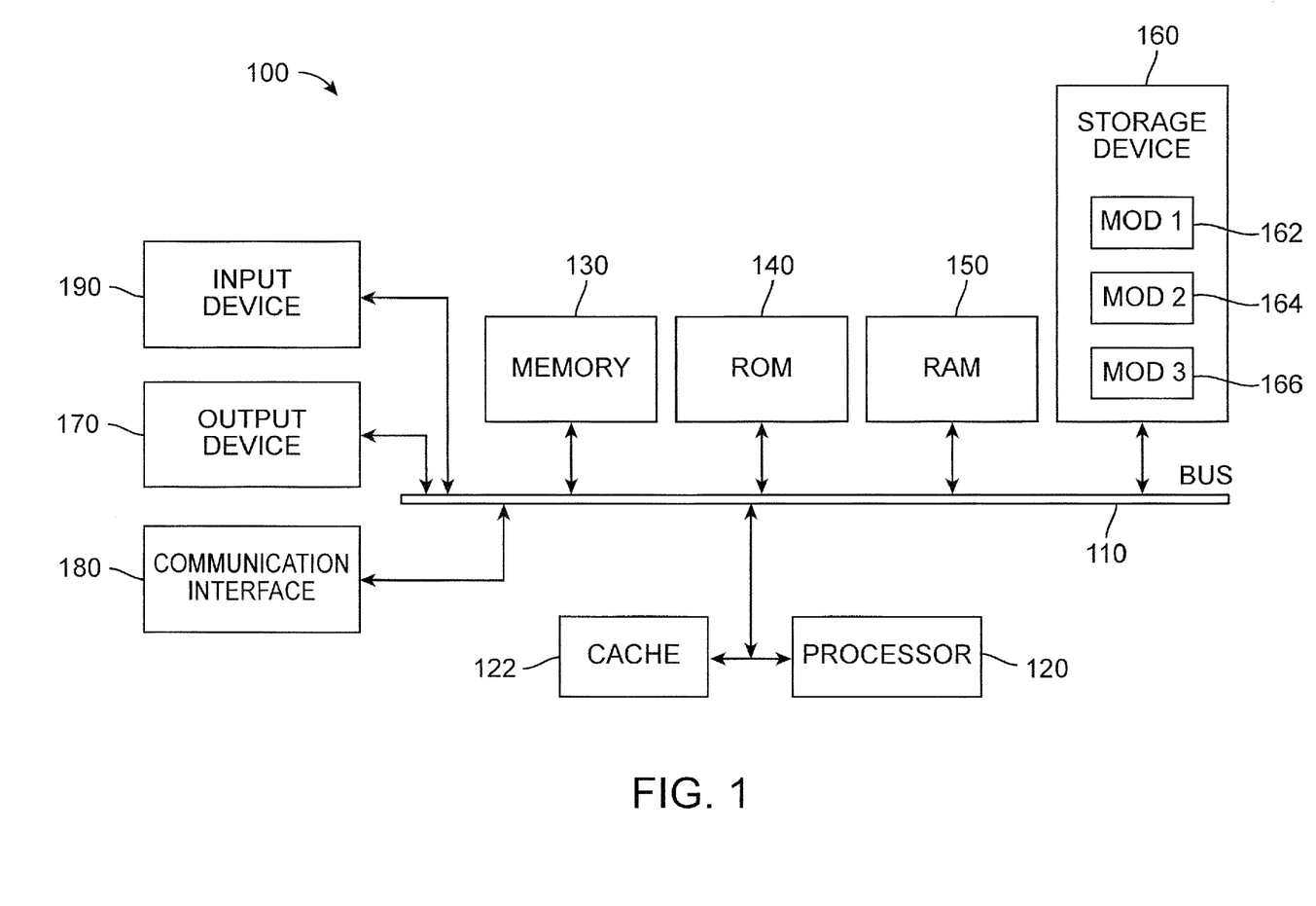
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (RUM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMS) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
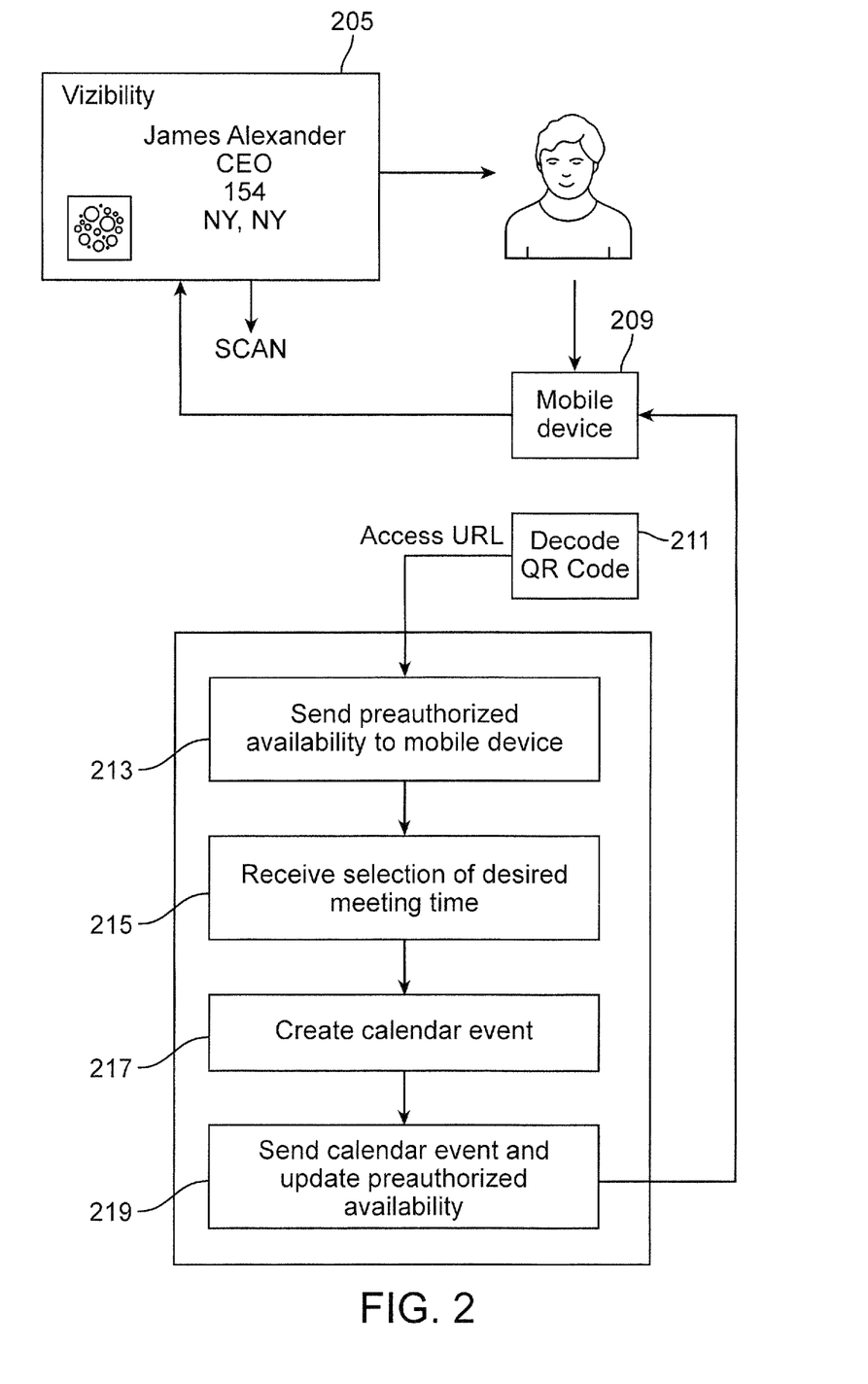
FIG. 2 depicts an example process for using a machine-readable code for scheduling calendar events.

FIG. 2 depicts an example of a process of using a machine-readable code for scheduling calendar events. An example tangible article that can include such machine-readable code is shown by business card 205. The tangible article can belong to a host (i.e., target user, service user), such as "James Alexander" (as illustrated in business card 205). At step 211, a mobile device 209 (i.e., computing device) can scan and decode the machine-readable code included on the business card 205. The decoding of the machine-readable code can enable the mobile device 209 to access a URL encoded within the machine-readable code. From the URL, the mobile device 209 can establish communications with a server for scheduling calendar events. At step 213, the server sends a preauthorized availability to the mobile device 209. The preauthorized availability can comprises one or more meeting times known (e.g., pre-determined, preauthorized) to be available to the host. For example, the host (e.g., "James Alexander") can pre-program, preset, and/or preauthorize his availability and provide information regarding his availability to the server. A user (i.e., attendee, requestor, etc.) of the mobile device 209, for example, can then make a selection of at least one desired meeting time from the one or more meeting times included in the preauthorized availability. At step 215, the server can receive the selection of the at least one desired meeting time. At step 217, the server creates a calendar event at the desired meeting time. The calendar event can include information about the host, the user of the mobile device, the location, the desired meeting time, the participants' contact information, and other meeting information. At step 219, the server can send the calendar event and update the preauthorized availability to not include the selected meeting time. For example, the calendar event and updated preauthorized availability can be sent to the host and/or to (the user of the) mobile device 209.

Figure 3:
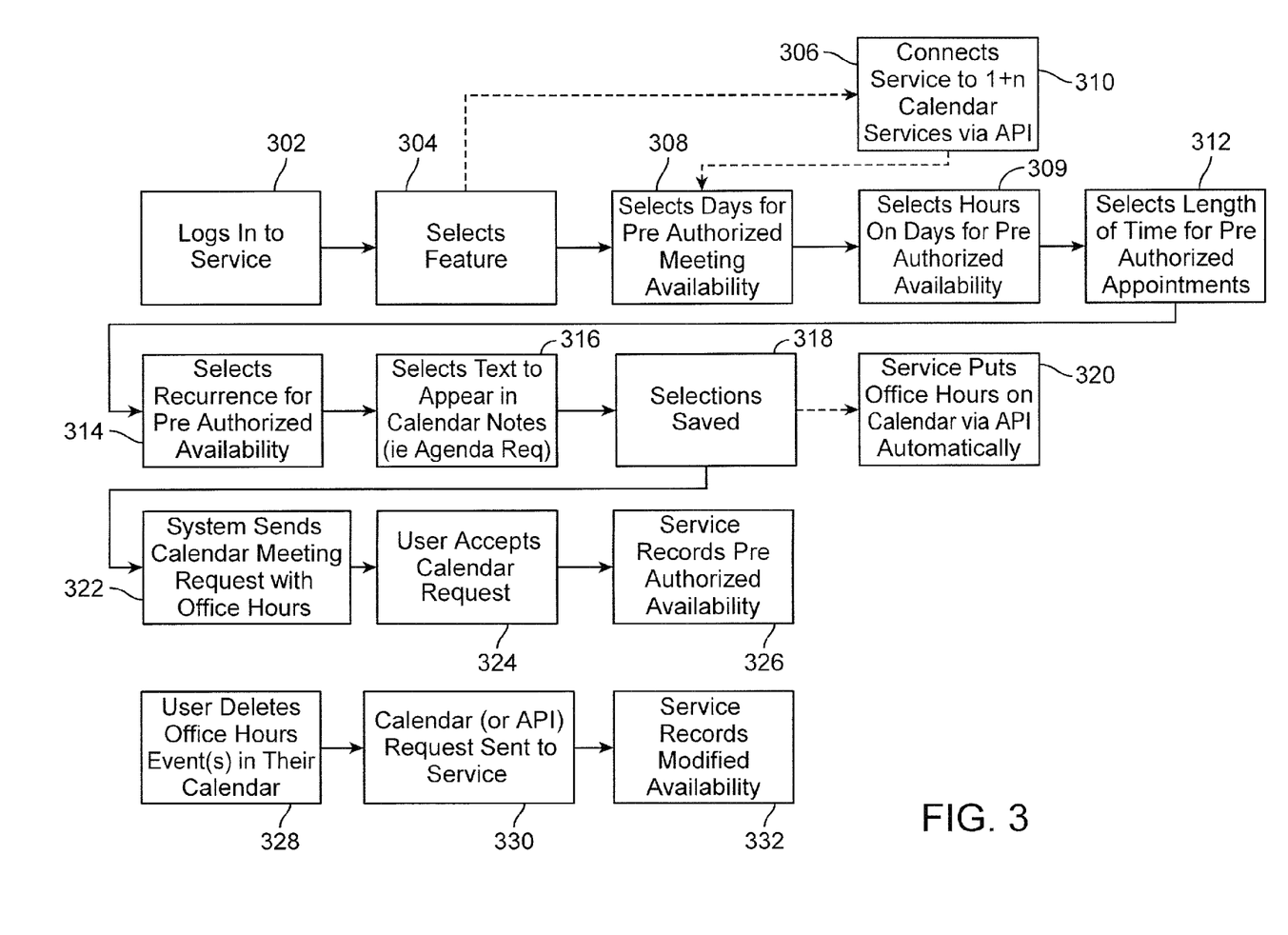
FIG. 3 illustrates an example method for setting preauthorized portions of a service user's calendar.

FIG. 3 illustrates an example method for setting preauthorized portions of a service user's (i.e., target user's, host's) calendar. As shown at step 302, a service user (i.e., target user, host) logs into a service provider. At step 304, the service user can select a calendar scheduling management feature provided by the service. Optionally, at step 306, the service provider connects to a calendar service via an API (application programming interface). In some embodiments, the service provider can connect to 1+n (third party) calendar services via their respective API's, where n is the number of other calendar services the service user has access to. For example, the service user can have accounts with other third party calendar services. If so, the service provider can establish connections with these third party calendar services for communicating and synching purposes.

Continuing with FIG. 3, at step 308, the service provider receives selected days for a preauthorized availability. In other words, the service user can select (e.g., preauthorize) days on which he/she is available for meetings/appointments; then the selected days are received by the service. At step 310, the service user can select/preauthorize hours (e.g., on the selected days) at which he/she is available. The service provider receives the selected hours for the service user's preauthorized availability. At step 312, the service user can select a length of time for the duration of appointments; the service provider receives the selected length of time for appointments for the service user's preauthorized availability. At step 314, the service provider receives a recurrence interval for the preauthorized availability selected by the service user. For example, the service user can preauthorize every other Monday at 3:00 pm to be available for a 15 minute appointment. At step 316, the service provider receives text to appear in a created calendar event, the text being selected/inputted by the service user. For example, the service user can input text such as "Please remember to provide an agenda. Looking forward to this appointment." At step 318, the selected days, hours, recurrence, and length of time are saved by the service. Optionally at step 320, the service automatically puts the preauthorized availability on the (e.g., 1+n) connected calendar services, if any, via API's. Alternatively or additionally, at step 322, the service/system sends the preauthorized availability as a calendar invite in a standardized format (e.g., via e-mail) and at step 324 the service user accepts/confirms the calendar invite. At step 326 the service records the preauthorized availability. The service user (e.g., host) is now configured with a preauthorized availability before any scheduling requests have been received.

At step 328, the service can receive a command from the service user to modify the preauthorized availability by deleting a desired portion. At step 330 a calendar adjustment file is sent to the calendar or the adjustment is made to the (e.g., 1+n) connected calendar services automatically via an API. At step 332, the service records the adjusted/modified/updated preauthorized availability.

Figure 4:
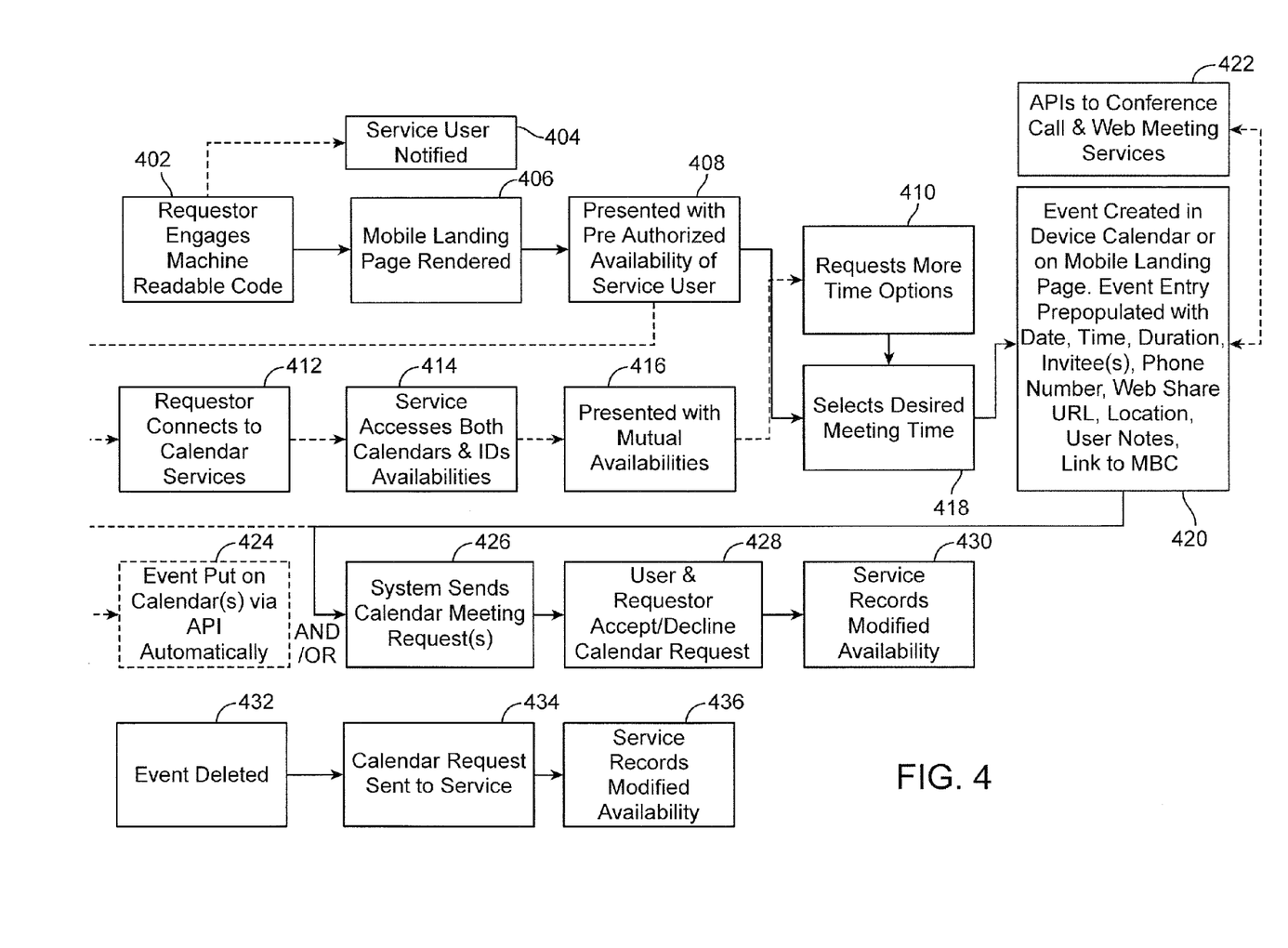
FIG. 4 illustrates an example method for scheduling a meeting in preauthorized portions of a service user's calendar.

FIG. 4 illustrates an example method for scheduling a meeting in preauthorized portions of a service user's calendar. At step 402 the service receives a request engaged from a machine-readable code, the request being made by a requestor to schedule an appointment with a service user (e.g., target user, host). Examples of a machine-readable code include a QR code, a Microsoft TAG, a matrix bar code, a wireless near-field communication signal, a RFID signal, a Bluetooth signal, a short-range wireless signal, a uniquely identifiable image, or a uniquely identifiable biometric code. Optionally at step 404, the service notifies the service user (e.g., host) of the received request. At step 406, a mobile landing page is rendered. For example, a user/requestor/attendee requesting for an appointment/meeting with a service user/host can use a computing device access a QR code on a business card of the service user/host, which renders a landing page on the computing device. At step 408, the requestor is presented (e.g., via the landing page) with the pre-authorized availability of the service user/host.

Optionally at step 412, the requestor's calendar (e.g., including third party calendar services) can connect to the service. At step 414, the service accesses both the requestor's and service user's calendars and identifies mutual availabilities. The service then presents 416 the mutual availabilities to the requestor. Optionally at step 410, the requestor can request more time options if the presented pre-authorized availability is deemed not desirable.

At step 418, the service receives a selected desired meeting time from the requestor. At step 420, the service creates an event in on the user's/attendee's/requestor's computing device calendar or on the mobile landing page. In one example, the service automatically populates the event with date, time, duration, invitee(s), phone number(s), web share URL(s), location, notes, and/or links to mobile business cards (MBC's) of the user/attendee/requestor and/or the service user/host. Optionally at step 422, the service can connect/communicate via APIs with conference call and web meeting services regarding the created calendar event.

Optionally at step 424, the service places the event on calendars (e.g., including third party calendar services of the host and/or the requestor) automatically via an API. Additionally or alternatively, at step 426, the service sends a calendar meeting request(s) to the service user and the requestor, and at step 428 the service user and requestor accept or decline the calendar meeting request(s). At step 430, the service records a modified/updated preauthorized availability for the service user; for example, if the service user and the requestor accept (e.g., at step 428) the calendar meeting request for the selected desired time period, then the selected desired time period can be removed from the preauthorized availability of the service user/host.

At step 432, a calendar event can be deleted by the service user and/or by the requestor. At step 434, a request is sent to the service reflecting the deletion. At step 436, the service receives the request, and modifies and stores the new/updated preauthorized availability.

Figure 5:
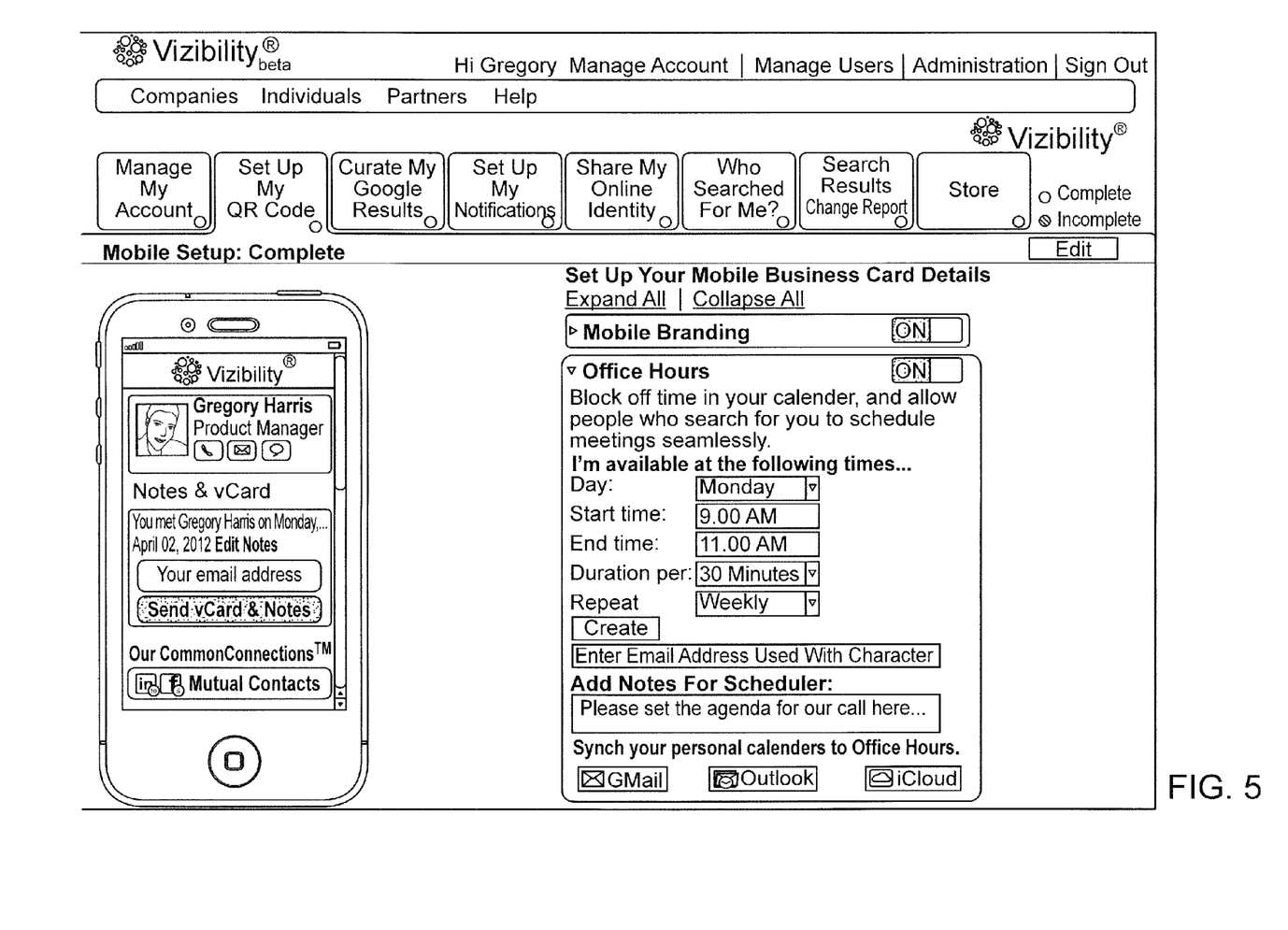
FIG. 5 illustrates a GUI for setting a preauthorized availability.

FIG. 5 illustrates a GUI for setting a preauthorized availability. As shown in FIG. 5, the GUI allows a service user (e.g., target user, host) to set a preauthorized availability including day(s)/date(s), start time, end time, duration, and repeat interval. In this specific example, a service user has entered a preauthorized availability on Mondays from 9 a.m. to 11 a.m. in 30-minute increments. This preauthorized availability repeats weekly.

Moreover, as shown in FIG. 5, the preauthorized availability for the service user can be synched with the service user's third party calendar services such as those associated with GMail, Outlook, and/or iCloud.

Figure 6:
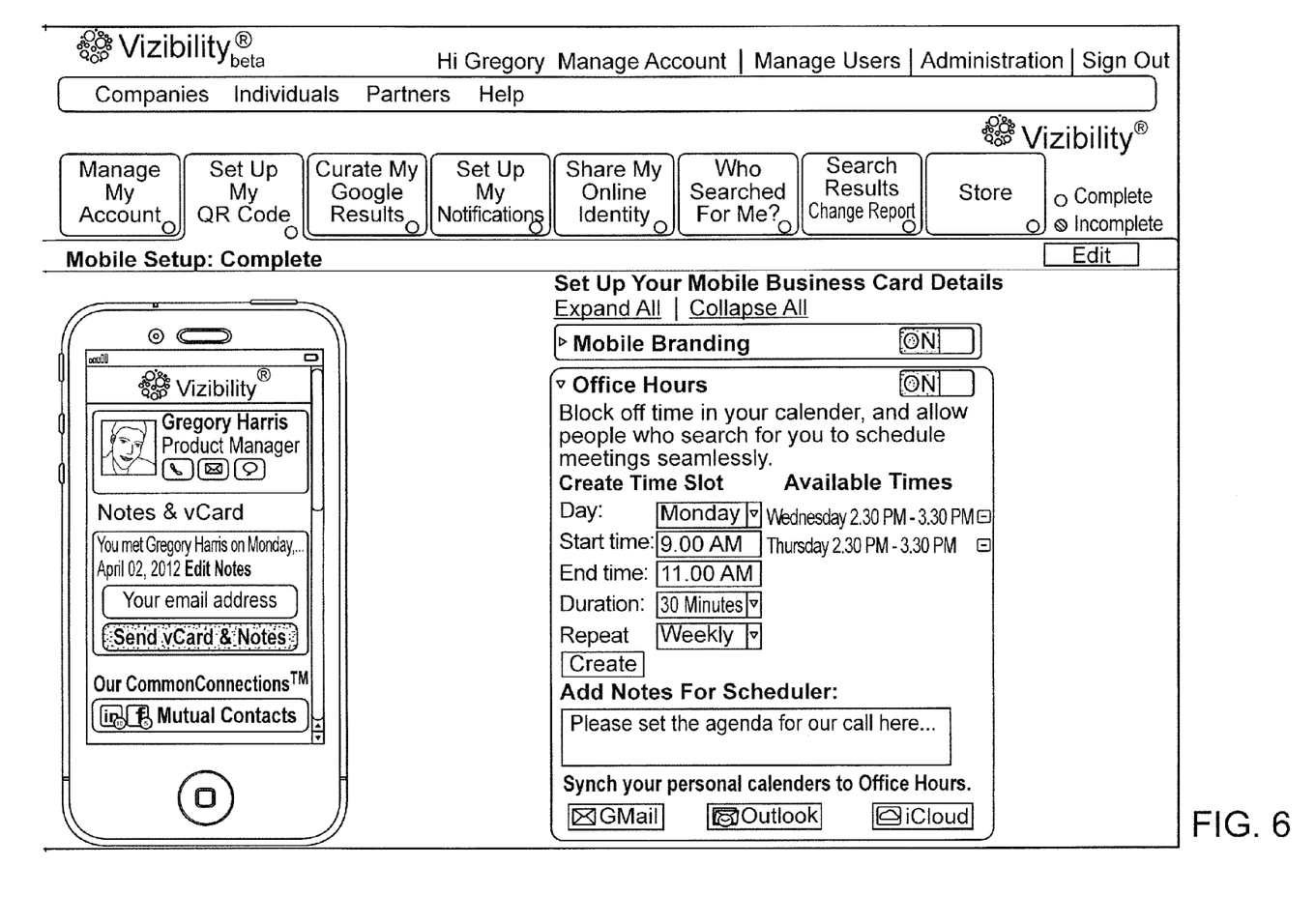
FIG. 6 presents a GUI for setting a preauthorized availability.

FIG. 6 presents a GUI for setting a preauthorized availability in which open calendar slots are automatically presented. Referring to FIG. 6, the GUI can automatically connect to a service user's calendar(s) via an API(s) and display that Wednesday from 2:30 pm to 3:30 pm and Thursday from 2:30 pm to 3:30 pm are available. For example, the other time slots might already be filled with appointments. Based at least in part upon the automatically presented available time slots, the service user can then set a preauthorized availability including date, start time, end time, duration, and repeat interval.

Figure 7:
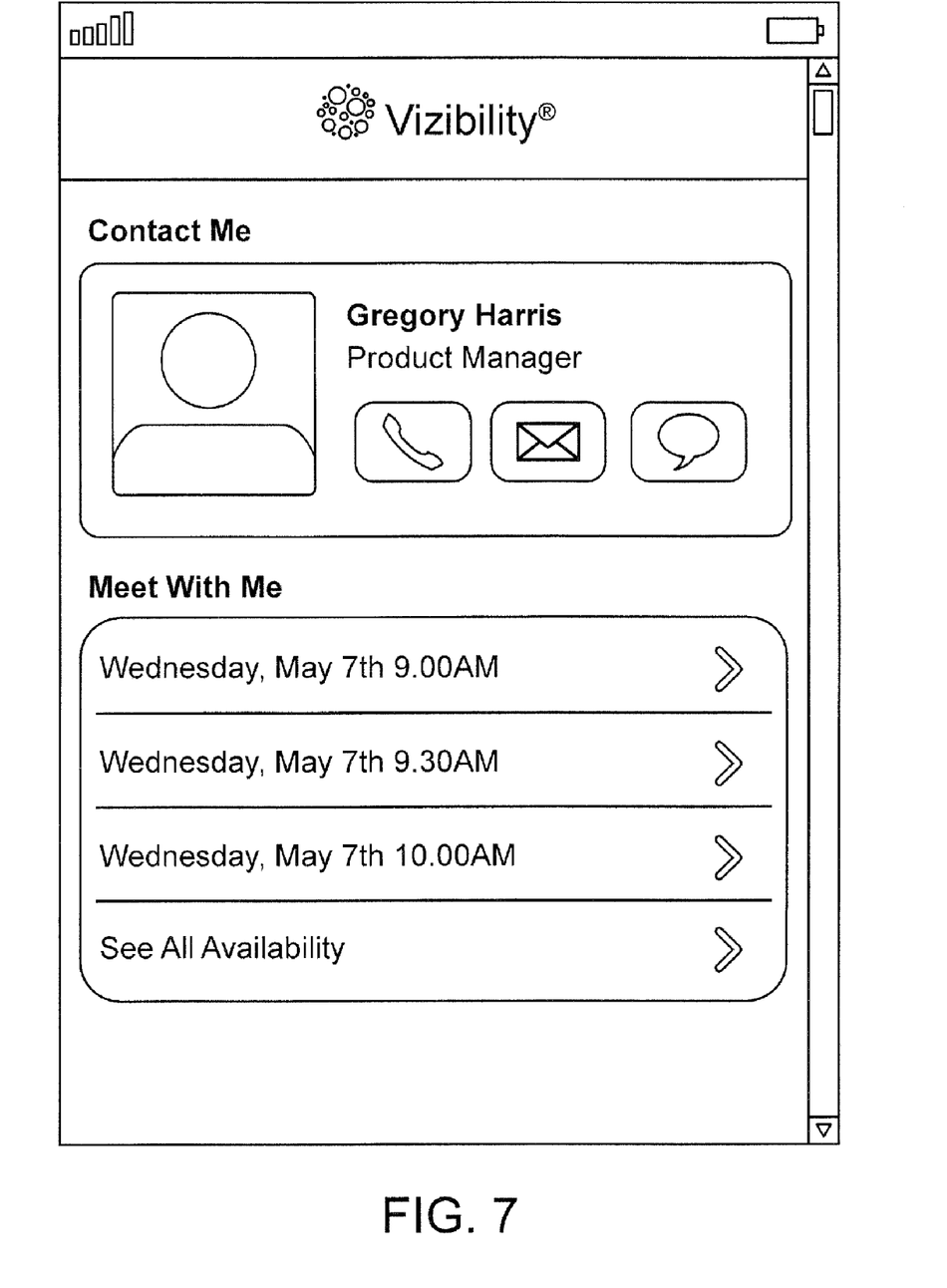
FIG. 7 presents a GUI that shows preauthorized availability for a service user.

FIG. 7 presents a GUI that shows preauthorized availability for a service user (e.g., Gregory Harris). For example, the GUI showing the preauthorized availability for the service user can be presented to a requestor/attendee. The GUI as shown in this example displays three proposed meeting times according to the service user's preauthorized availability. In this example, a requestor/attendee can select a 30-minute meeting on Wednesday, May 7$^{th}$ at 9 am, Wednesday, May 7$^{th}$ at 9:30 am, or Wednesday, May 7$^{th}$ at 10 am.

Figure 8:
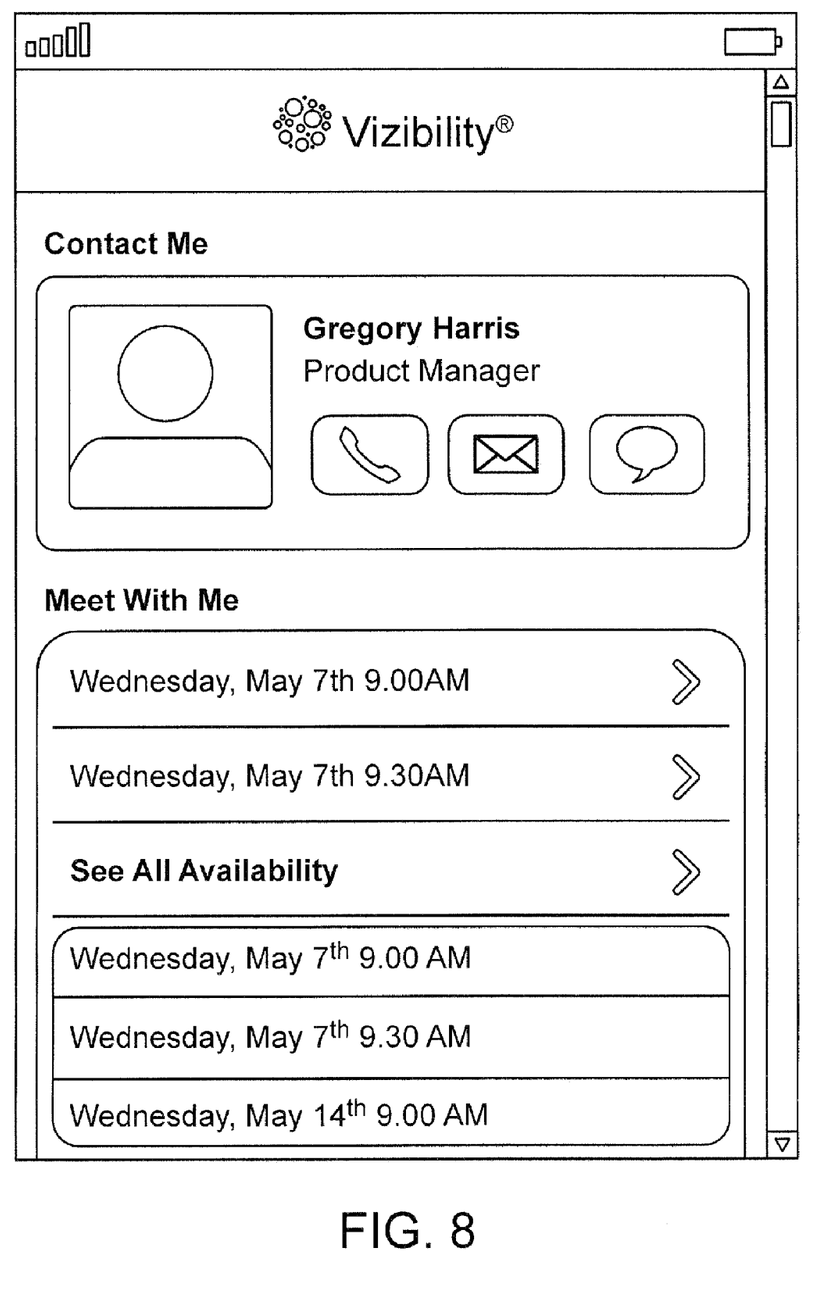
FIG. 8 presents a GUI that allows a requestor to request more time options and to select a desired meeting time.

FIG. 8 presents a GUI that allows a requestor to request more time options and to select a desired meeting time. As shown in FIG. 8, a requesting user/requestor/attendee did not select the proposed times of Wednesday, May 7$^{th}$ at 9 am or Wednesday May 7$^{th}$ at 9:30 am and requested more options. The requesting user has activated these additional options by selecting the "See All Availability" interface element in FIG. 8. As shown, the additional options are Wednesday May 7$^{th}$ at 9 am, Wednesday May 7$^{th}$ at 9:30 am, and Wednesday May 14$^{th}$ at 9 am.

Figure 9:
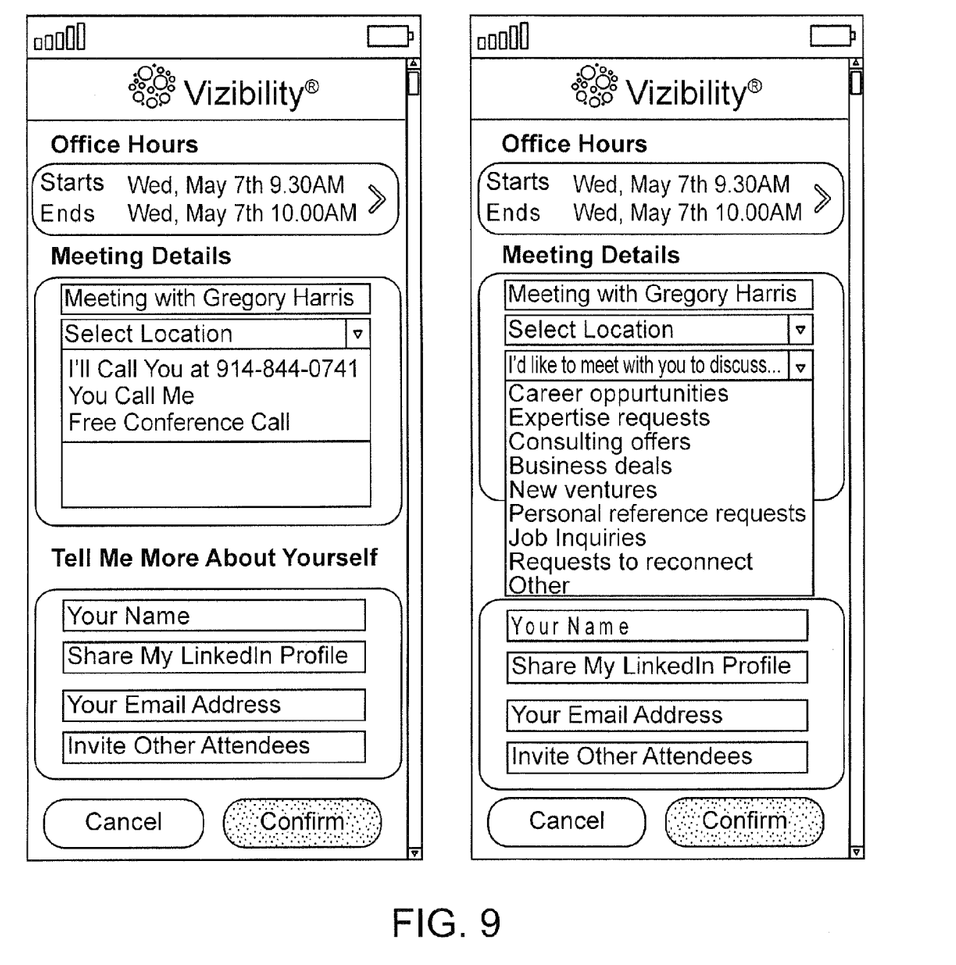
FIG. 9 presents a GUI that allows a requestor to select a location and reason/description for a meeting.

FIG. 9 presents a GUI that allows a requestor to select a location and reason/description for a meeting. In a first screenshot of FIG. 9, a requestor can, for example, select from three location options: (1) "I'll Call You" at a designated number, (2) "You Call Me" (at some designated number), or (3) "Free Conference Call" which will utilize a conference call service. In a second screenshot of FIG. 9, a requestor can, for example, select from multiple options in a pull-down menu to indicate a reason/description for the meeting. Although the pull-down menu with set options is shown, one of skill in the art will recognize that other GUIs can utilize other interface elements and text entry fields for a requesting user (i.e., requestor) to designate a reason(s)/description(s) for a meeting.

In FIG. 9, after the requesting user selects a confirm button, an event is created in a device calendar and/or on a mobile landing page. The event can be pre-populated with date, time, duration, invitee(s), phone number(s), web share URL(s), reason/description for meeting, a custom event agenda, and/or other event information.

Figure 10:
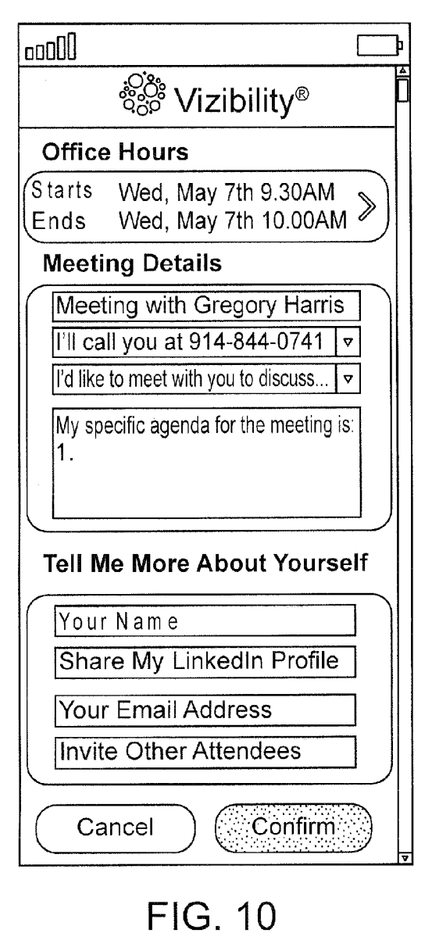
FIG. 10 presents a GUI that allows a requester to contact a service user via a click-to-call function.

FIG. 10 presents a GUI that allows a requester to contact a service user via a click-to-call function. Once the requestor selects the confirm button in FIG. 10, the event will include a link that automatically calls the service user at the (e.g., service user's) displayed number.

Figure 11:
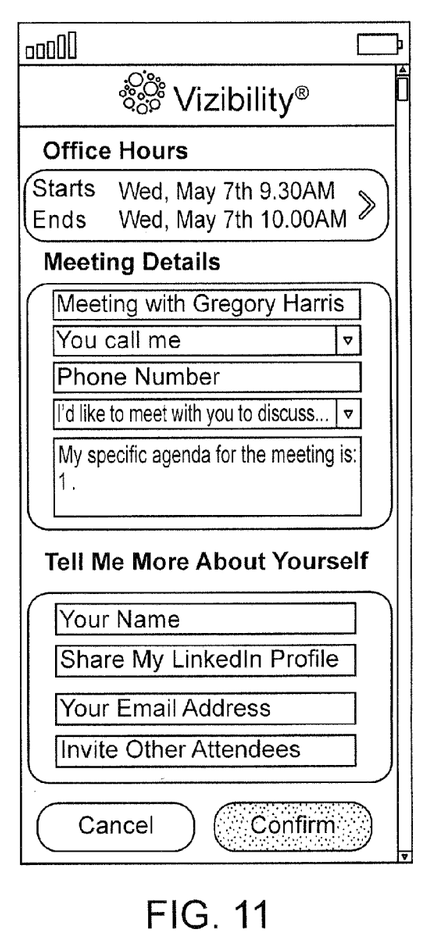
FIG. 11 presents a GUI that allows a requestor to input a phone number through which a service user can reach him/her.

FIG. 11 presents a GUI that allows a requestor to input a phone number through which a service user can reach him/her. As shown, a requestor has selected a "You Call Me" function/option such that the requestor can then enter a phone number into a field, which will then populate into the calendar event entry in the service user's calendar. Based on the phone number entered, the service/target user can call the requestor at the time of the meeting event.

Figure 12:
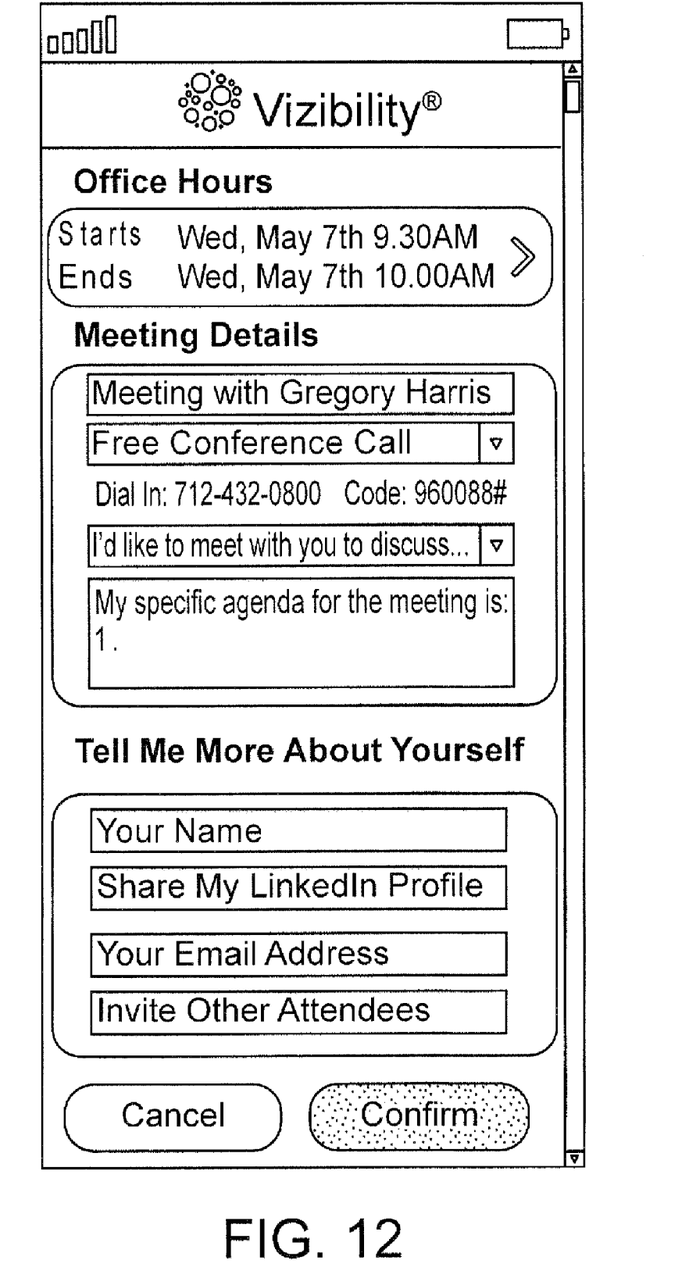
FIG. 12 presents a GUI that includes a conference call number for a calendar event.

FIG. 12 presents a GUI that includes a conference call number for a calendar event. As shown, a requestor has selected a "Free Conference Call" function/option. In response to receiving this selected function/option and receiving a confirmation via the "confirm" button, the service can generate or obtain a free conference call for all parties to dial-in to. The service can further populate this into the calendar event in the service user and/or requestor's calendar.

Figure 13:
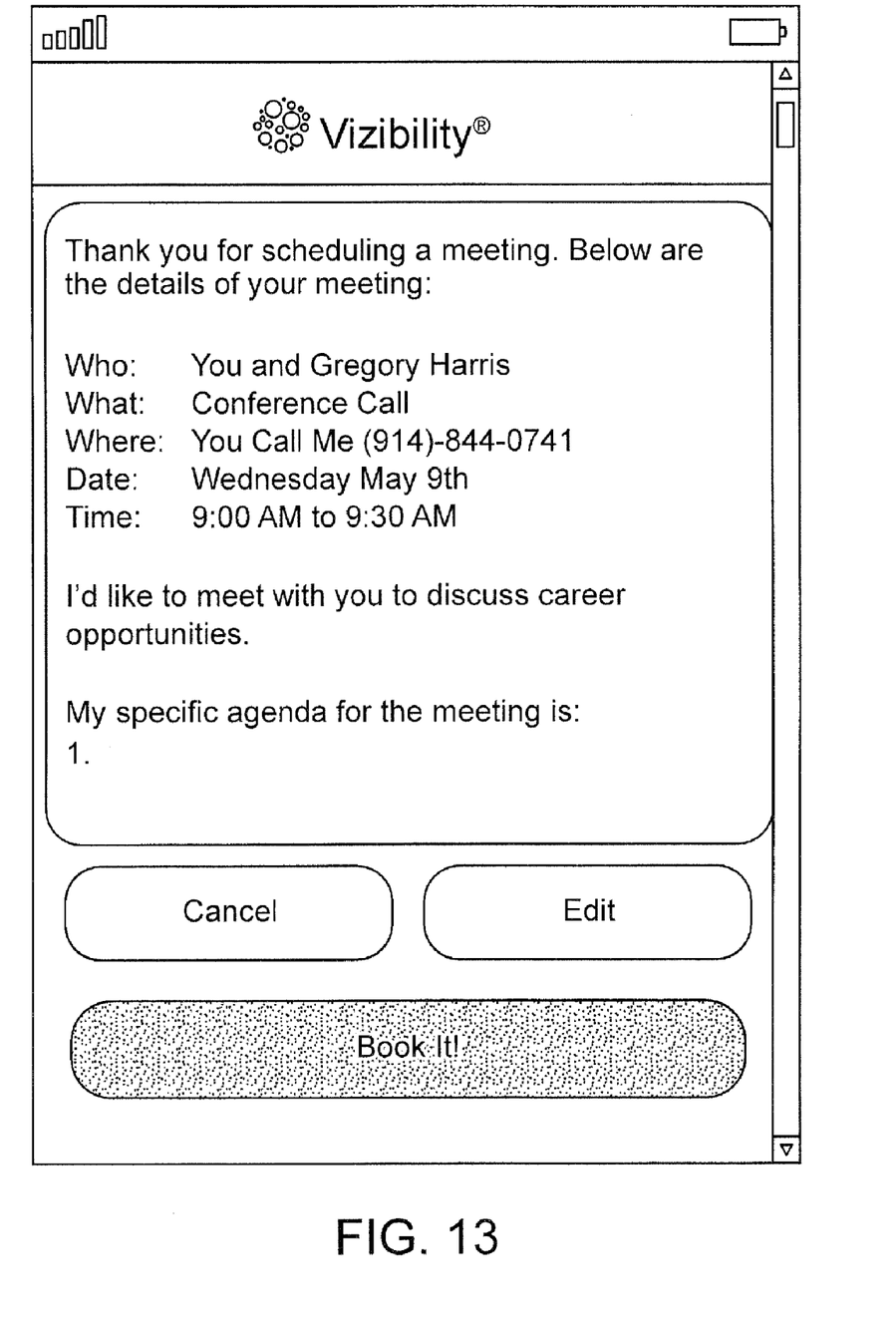
FIG. 13 presents a GUI that sends a calendar request to all parties involved.

FIG. 13 presents a GUI that sends a calendar request to all parties involved. A screenshot in FIG. 13 displays various information related to a scheduled meeting. The information can include, but is not limited to, the participants, method of communication, contact information, location, date, time, duration, reason/description for meeting, and specific agenda data. In response to receiving a user command via the "Book It!" button, the service will send a calendar meeting request with the displayed data to the service user and/or requestor. By sending the calendar meeting request in this manner the disclosed technology is able to accommodate users with various calendar systems including but not limited to Outlook, iCal, Google Calendar, Yahoo Calendar, etc.

The disclosure now turns to exemplary method embodiments. For the sake of clarity, the methods are discussed in terms of an exemplary system 100 as shown in FIG. 1 configured to practice the method. The steps outlined herein are exemplary and can be implemented in any combination thereof, including combinations that exclude, add, or modify certain steps.

In one embodiment, the system 100 receives, from a requesting device associated with a requestor, an invite request referencing a network address associated with a calendar for a target user, wherein the network address is encoded in a machine-readable code from which the requesting device extracted the network address. In one example, the machine-readable code is a QR code, a Microsoft TAG, a matrix bar code, a wireless near-field communication signal, a RFID signal, a Bluetooth signal, a short-range wireless signal, a uniquely identifiable image, or a uniquely identifiable biometric code. The system 100 then sends a preauthorized availability for the calendar of the target user to the requesting device, wherein the availability is for a predetermined time length. The system 100 then receives a selection of a desired meeting time within the preauthorized availability from the requesting device. The system 100 then creates a calendar event according to the received selected desired meeting time.

In one example, the system 100 can automatically place the calendar event on the target user calendar via an API and update the preauthorized availability to exclude the placed calendar event. In another example, the system 100 can send the calendar event to the target user calendar, detect acceptance of the calendar event, and update the preauthorized availability to exclude the placed calendar event. In another example, when the server 100 presents the preauthorized availability for the target user the server 100 only presents mutual availabilities for the target user and requestor. In another example, the server can pre-populating the calendar event with at least one of date, time, duration, one or more invitees, phone number, web share URL, location, notes, and a link to a user profile.

In some embodiments, third party calendar services can provide their own API's for the service (provider) to utilize in establishing connections and/or communicating with the calendar services. For example, third party calendar services such as iCal® on Apple® computers or Calendar on iPhones® can provide means to communicate with their calendar databases, such as EventKit. Similarly, for example, Google Calendar™ and Microsoft® Outlook® also provide API's for application developers.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A computer-implemented method comprising:
   receiving, from a requesting device associated with a requestor, an invite request referencing a network address associated with a calendar for a target user, wherein the network address is encoded in a machine-readable code from which the requesting device extracted the network address;
   sending a preauthorized availability for the calendar of the target user to the requesting device, wherein the availability is for a predetermined time length;
   receiving a selection of a desired meeting time within the preauthorized availability from the requesting device;
   creating a calendar event according to the received selected desired meeting time; and
   updating the preauthorized availability to exclude the calendar event.

2. The method of claim 1, further comprising automatically placing the calendar event on the target user calendar via an API.

3. The method of claim 1, further comprising sending the calendar event to the target user calendar.

4. The method of claim 1, wherein the machine-readable code is selected from the group consisting of: a QR code, a Microsoft TAG, a matrix bar code, a wireless near-field communication signal, a RFID signal, a Bluetooth signal, a short-range wireless signal, a uniquely identifiable image, and a uniquely identifiable biometric code.

5. The method of claim 1, further comprising pre-populating the calendar event with at least one of date, time, duration, one or more invitees, phone number, web share URL, location, notes, and a link to a user profile.

6. The method of claim 1, further comprising presenting the preauthorized availability for the target user by only presenting mutual availabilities for the target user and requestor.

7. A system comprising:
   a processor;
   a computer-readable storage medium storing instructions for controlling the processor to perform steps comprising:
   receiving, from a requesting device associated with a requestor, an invite request referencing a network address associated with a calendar for a target user, wherein the network address is encoded in a machine-readable code from which the requesting device extracted the network address;
   sending a preauthorized availability for the calendar of the target user to the requesting device, wherein the availability is for a predetermined time length;
   receiving a selection of a desired meeting time within the preauthorized availability from the requesting device;
   creating a calendar event according to the received selected desired meeting time; and
   updating the preauthorized availability to exclude the calendar event.

8. The system of claim 7, the instructions further comprising automatically placing the calendar event on the target user calendar via an API.

9. The system of claim 7, the instructions further comprising sending the calendar event to the target user calendar.

10. The system of claim 7, wherein the machine-readable code is selected from the group consisting of: a QR code, a Microsoft TAG, a matrix bar code, a wireless near-field communication signal, a RFID signal, a Bluetooth signal, a short-range wireless signal, a uniquely identifiable image, and a uniquely identifiable biometric code.

11. The system of claim 7, the instructions further comprising pre-populating the calendar event with at least one of date, time, duration, one or more invitees, phone number, web share URL, location, notes, and a link to a user profile.

12. The system of claim 7, the instructions further comprising presenting the preauthorized availability for the target user by only presenting mutual availabilities for the target user and requestor.

13. A non-transitory computer-readable medium comprising computer-executable instructions stored thereon for causing a machine to perform a method comprising:
   receiving, from a requesting device associated with a requestor, an invite request referencing a network address associated with a calendar for a target user, wherein the network address is encoded in a machine-readable code from which the requesting device extracted the network address;
   sending a preauthorized availability for the calendar of the target user to the requesting device, wherein the availability is for a predetermined time length;
   receiving a selection of a desired meeting time within the preauthorized availability from the requesting device;
   creating a calendar event according to the received selected desired meeting time; and
   updating the preauthorized availability to exclude the calendar event.

14. The non-transitory computer-readable medium of claim 13, the instructions further comprising automatically placing the calendar event on the target user calendar via an API.

15. The non-transitory computer-readable medium of claim 13, the instructions further comprising sending the calendar event to the target user calendar.

16. The non-transitory computer-readable medium of claim 13, wherein the machine-readable code is selected from the group consisting of: a QR code, a Microsoft TAG, a matrix bar code, a wireless near-field communication signal, a RFID signal, a Bluetooth signal, a short-range wireless signal, a uniquely identifiable image, and a uniquely identifiable biometric code.

17. The non-transitory computer-readable medium of claim 13, the instructions further comprising pre-populating the calendar event with at least one of date, time, duration, one or more invitees, phone number, web share URL, location, notes, and a link to a user profile.

18. The non-transitory computer-readable medium of claim 13, the instructions further comprising presenting the preauthorized availability for the target user by only presenting mutual availabilities for the target user and requestor.

* * * * *